US008599169B2

(12) United States Patent
Nascimento

(10) Patent No.: US 8,599,169 B2
(45) Date of Patent: Dec. 3, 2013

(54) TOUCH SENSE INTERFACE CIRCUIT

(75) Inventor: Ivan Carlos Ribeiro Nascimento, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 10 days.

(21) Appl. No.: 13/325,747

(22) Filed: Dec. 14, 2011

(65) Prior Publication Data

US 2013/0154992 A1  Jun. 20, 2013

(51) Int. Cl.
*G06F 3/045* (2006.01)

(52) U.S. Cl.
USPC ........................................... 345/174; 345/173

(58) Field of Classification Search
USPC .................. 345/172–178; 324/661, 672, 686; 178/18.01–18.04
See application file for complete search history.

(56) References Cited

U.S. PATENT DOCUMENTS

| 5,914,922 | A * | 6/1999 | Supino et al. | 369/44.28 |
| 7,498,822 | B2 | 3/2009 | Lee | |
| 7,768,272 | B2 * | 8/2010 | Kato et al. | 324/672 |
| 7,923,936 | B2 | 4/2011 | Cooley et al. | |
| 8,018,197 | B2 * | 9/2011 | Nascimento | 320/116 |
| 8,040,143 | B2 * | 10/2011 | Nascimento | 324/678 |
| 8,228,312 | B2 * | 7/2012 | Matsubara | 345/174 |
| 2006/0265159 | A1 * | 11/2006 | Smith et al. | 702/66 |
| 2008/0122454 | A1 * | 5/2008 | Kato | 324/661 |
| 2010/0328249 | A1 * | 12/2010 | Ningrat et al. | 345/174 |
| 2011/0007028 | A1 | 1/2011 | Curtis et al. | |
| 2011/0037723 | A1 | 2/2011 | Huang et al. | |
| 2011/0063993 | A1 * | 3/2011 | Wilson et al. | 370/254 |
| 2011/0074445 | A1 | 3/2011 | Nascimento | |
| 2011/0115717 | A1 * | 5/2011 | Hable et al. | 345/173 |
| 2011/0148439 | A1 * | 6/2011 | Yamada | 324/679 |
| 2012/0056822 | A1 * | 3/2012 | Wilson et al. | 345/173 |
| 2013/0002350 | A1 * | 1/2013 | Boldt | 330/253 |

OTHER PUBLICATIONS

Electromagnetic compatability (EMC)—Part 4-6: Testing and measurement techniques—Immunity to conducted disturbances, induced by radio-frequency fields, Oct. 2008, pp. 1-56, International Electrotechnical Commission, Edition 3.0, ISBN 2-8318-1004-4.
Larry K. Baxter, Capacitive Sensors, IEEE Press Series on Electronics Technology, cover page, pp. 48-65 and pp. 74-82, Sep. 3, 1996, Published under the Sponsorship of the IEEE Industrial Electronics Society.

* cited by examiner

*Primary Examiner* — Kent Chang
*Assistant Examiner* — Sujit Shah

(57) ABSTRACT

A touch sensing interface (101) includes a noise touch sensing circuit (110) that utilizes electromagnetic (EM) noise in a touch panel (102) to determine whether a pad of the touch panel is touched, such as by a finger of a user. The noise touch sensing circuit detects noise in a first pad (104) and in a second pad (105) of the touch panel, compares power of the noise in the first pad to power of noise in the second pad, and outputs a signal (132) indicative of the first pad being touched when power of noise in the first pad exceeds power of noise in the second pad by a pre-selected amount. The touch sensing interface may include a capacitive touch sensing circuit (120) and a controller (130) that selectively actuates the noise touch sensing circuit and the capacitive touch sensing circuit.

13 Claims, 4 Drawing Sheets

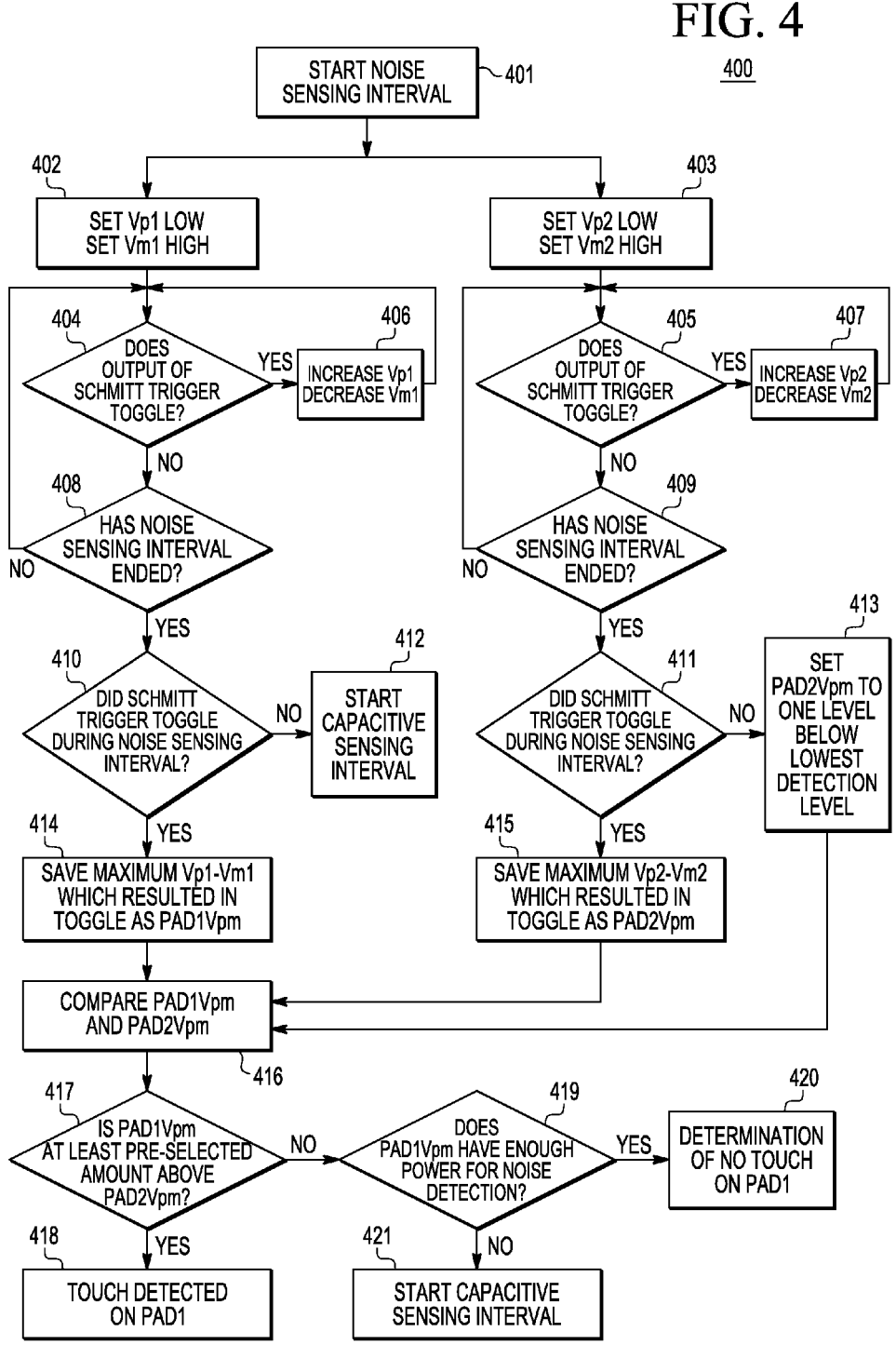

TOUCH SENSE INTERFACE CIRCUIT

BACKGROUND

1. Field

This invention relates generally to touch sense interface circuits, and more specifically a touch sense interface circuit that can be used under noisy electromagnetic conditions.

2. Related Art

A touch sense interface circuit, when coupled to a touch panel, recognizes occurrence of a touch when a user's finger is touching or is very close to, such as a few millimeters from, a touch pad of the touch panel.

A capacitive touch sense interface circuit usually provides good results under normal conditions but its operation may be disrupted when subjected to electromagnetic (EM) aggression. EM aggression occurs when EM noise emanating from outside of a circuit, or external EM noise, interferes with operation of the circuit.

The magnitude, frequency and duration of the external EM noise can vary in an unknown manner. Disruption of operation of a capacitive touch sense interface circuit due to external EM noise is more likely to occur in a low-power capacitive touch sense interface circuit because the power of the external EM noise can be high relative to the power of signals used for operation of the low-power capacitive touch sense interface circuit.

Many capacitive touch sense interface circuits compare an internal time reference with external timing of charge or oscillation that is dependent on presence or absence of a touch. One known capacitive touch sense interface circuit determines a ratio of internal oscillation frequency with an external oscillation frequency. A touch causes a capacitance change, which changes said ratio, and, as a result, the touch is detected.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 is a flow diagram of one embodiment of a touch detection method for use with the touch sense interface system of FIG. 1.

DETAILED DESCRIPTION

Figure 1:
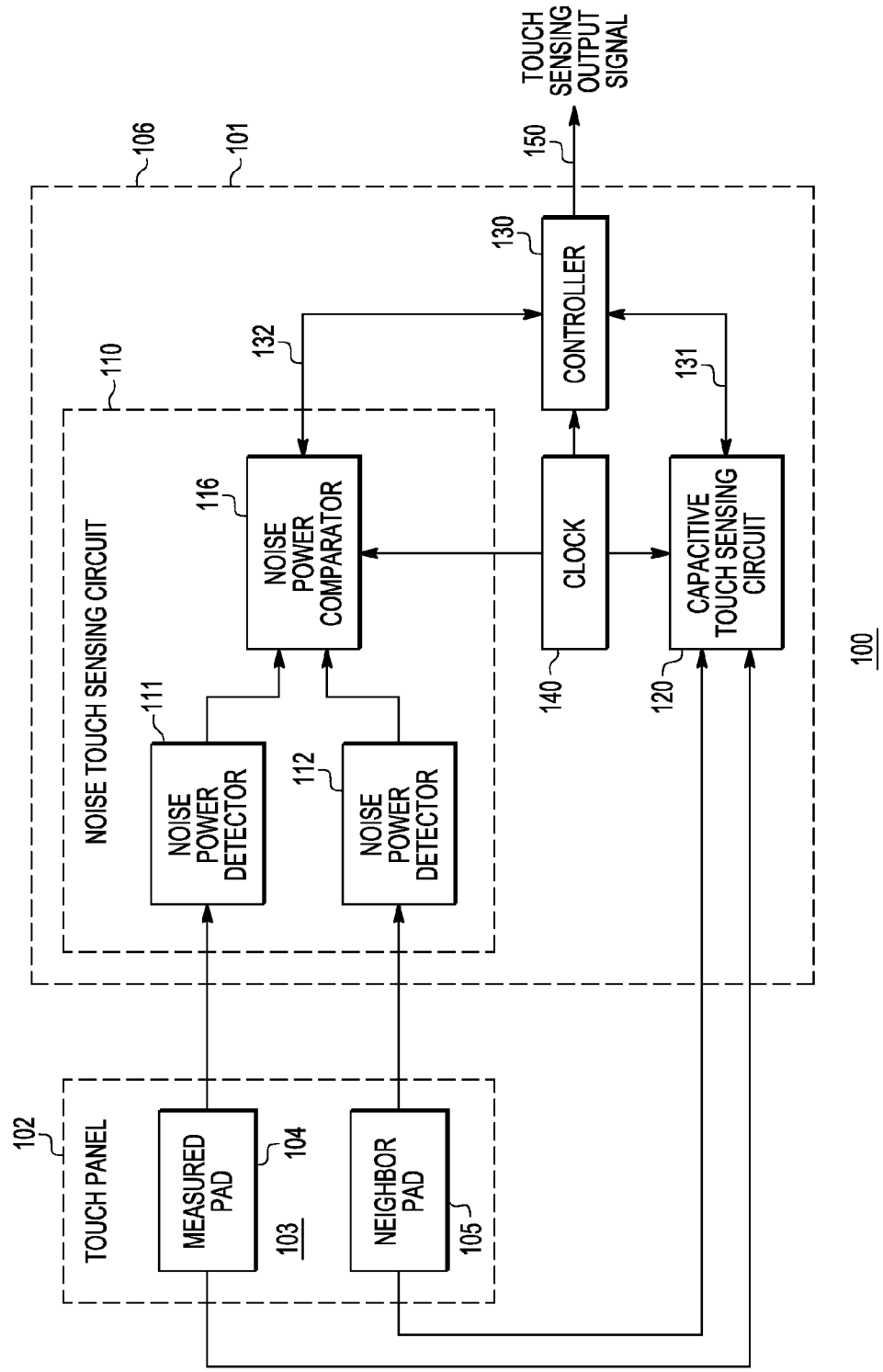
FIG. 1 is a simplified functional block diagram of a touch sense interface system, including a touch panel and noise touch sensing circuit in accordance with one embodiment of the invention.

FIG. 1 is a simplified functional block diagram of one embodiment of a touch sense interface system 100. The touch sense interface system 100 includes a touch sense interface 101 coupled to a touch panel 102. The touch panel 102 comprises a plurality of touch pads 103 including a measured pad 104 and at least one neighbor pad 105. The at least one neighbor pad 105 is a touch pad (hereinafter also written "pad") that is closest to the measured pad 104. In one embodiment, the touch sense interface 101 resides in an integrated circuit 106, and the touch panel 102 is outside the integrated circuit. The touch sense interface 101 comprises, in one embodiment, a noise touch sensing circuit 110 in accordance with one embodiment of the invention and a capacitive touch sensing circuit 120. The noise touch sensing circuit 110 advantageously detects external EM noise (hereinafter also written "noise"). The detection of noise has two roles. A first role is to determine whether the power of the noise is, or is not, enough to disrupt operation of the capacitive touch sensing circuit 120. A second role is to detect occurrence of a touch using noise itself when enough noise is present. The detection of no noise can also be used to validate results from the capacitive touch sensing circuit 120.

In the embodiment shown FIG. 1, the touch panel 102 is coupled to the noise touch sensing circuit 110 and to the capacitive touch sensing circuit 120. In another embodiment (not shown), the touch sense interface 101 comprises only the noise touch sensing circuit 110 in accordance with the invention, and the touch panel 102 is coupled to the noise touch sensing circuit 110. The touch sense interface 101 includes a controller 130 coupled to the noise touch sense interface 110 and to the capacitive touch interface 120. The touch sense interface 101 includes a clock 140 coupled to the noise touch sense interface 110, to the capacitive touch interface 120 and to the controller 130. The clock 140 may include various timing circuits. The controller 130 outputs a touch sensing output signal 150. Based on a value of the touch sensing output signal 150, the touch sense interface 101 provides an indication that the measured pad 104 has been touched, such as by a finger of a user, or provides an indication that the measured pad has not been touched.

Based on a signal from the clock 140, the controller 130 creates alternating capacitive sensing intervals and noise sensing intervals in the embodiment of the touch sense interface 101 illustrated in FIG. 1. The controller 130 activates the capacitive touch sensing circuit 120 during each capacitive sensing interval, and the controller activates the noise touch sensing circuit 110 during each noise sensing interval. During each capacitive sensing interval, the capacitive touch sensing circuit 110 outputs to the controller 120, via line 131, results of its operation. If the capacitive touch sensing circuit 120 is able to conclusively determine, during a capacitive sensing interval, that a touch has or has not occurred, then the controller 130 causes the touch sense interface 101 to provide an indication that the measured pad 104 has, or has not, been touched, as the case may be. If the capacitive touch sensing circuit 120 is not able to conclusively determine, during a capacitive sensing interval, that a touch has or has not occurred, then the controller 130 activates the noise touch sensing circuit 110 during a next following noise sensing interval. In another embodiment, if the capacitive touch sensing circuit 120 is not able to conclusively determine, during a capacitive sensing interval, that a touch has or has not occurred, then the controller 130 immediately starts a noise sensing interval. During each noise sensing interval, the noise touch sensing circuit 110 outputs to the controller 130, via line 132, results of its operation.

The embodiment of the noise touch sense interface 110 illustrated in FIG. 1 comprises a first noise power detector 111 for measuring noise power at the measured pad 104, and a second noise power detector 112 for measuring noise power at the neighbor pad 105. An output signal of the first noise power detector 111 is representative of the noise power at the measured pad 104. An output signal of the second noise power detector 112 is representative of the noise power at the neighbor pad 105. The first noise power detector 111 and second noise power detector 112 may use peak detection, root mean squared (RMS) detection, or another type of detection to measure the noise. Although values of the noise measurements may be different depending on a method used to measure noise, a ratio of the noise measurements is not affected by the type of power detection used.

The first noise power detector 111 and a second noise power detector 112 are coupled a noise power comparator 116 that compares a value of the output signal of the first noise power detector 111 and a value of the output signal of the second noise power detector 112. The noise power comparator 116 outputs a signal based on magnitude of noise power detected by the first noise power detector 111 and magnitude of noise power detected by the second noise power detector 112. The noise power comparator 116 outputs a signal whose value represents that a) a touch has occurred, b) a touch has not occurred, or c) the magnitude of the noise power in the measured pad 104 and/or the noise power in the neighbor pad 105 is such that neither a determination of touch nor a determination of no touch can be made. A touch occurs, for example, when a finger is in contact with, or very close to, the measured pad 104. The noise power in the measured pad 104 increases when a finger is in contact with, or very close to, the measured pad because external noise, which emanates from outside the touch sense interface system 100, is induced into the measured pad. At a same time, the external noise is induced into the neighbor pad 105 to a much lesser degree than the external noise is induced into the measured pad 104 because the finger is, by definition, at a greater distance from the neighbor pad than from the measured pad. The capacitance between a finger and a touched pad, such as the measured pad 104, is much greater than capacitance between the finger and another pad, such as the neighbor pad 105, because the capacitance C is inversely proportional to finger-to-pad distance d, i.e., $C \alpha 1/d$.

The noise power comparator 116 outputs a TOUCH DETECT signal when the value of the output signal of the first noise power detector 111 exceeds the value of the output signal of the second noise power detector 112 by a pre-selected amount. The pre-selected amount is based upon the construction of the touch panel and upon experimental trials. In one embodiment, the noise power comparator 116 outputs the TOUCH DETECT signal when the value of the output signal of the first noise power detector 111 exceeds the value of the output signal of the second noise power detector 112 by about 10 dB.

The noise power comparator 116 outputs a NO TOUCH signal when two conditions are met: first, the value of the output signal of the first noise power detector 111 does not exceed the value of the output signal of the second noise power detector 112 by the pre-selected amount, and second, the value of the output signal of the first noise power detector 111 is at least at the pre-selected level. The value of the output signal of the first noise power detector 111 being at least at the pre-selected level means that enough external noise is induced into the touch panel to allow the noise touch sensing circuit 110 to function. The first condition may occur, for example, when the value of the output signal of the first noise power detector 111 is near the value of the output signal of the second noise power detector 112, which is likely to be the case when a finger is far from both the measured pad 104 and the neighbor pad 105. A finger far from both the measured pad 104 and the neighbor pad 105 is, by definition, a "no touch" situation.

The noise power comparator 116 outputs an INCONCLUSIVE signal when the value of the output signal of the first noise power detector 111 is not at least at the pre-selected level. The value of the output signal of the first noise power detector 111 being not at least at the pre-selected level means that not enough external noise is induced into the touch panel to allow the noise touch sensing circuit 110 to function. In one embodiment, the INCONCLUSIVE signal causes the controller 130 to immediately start the capacitive sensing interval. In another embodiment, the capacitive sensing interval starts at its scheduled time, notwithstanding the INCONCLUSIVE signal.

The controller 130 represents hardware, software, and/or firmware components of the touch sense interface 101 configured to control operation of the components of the touch sense interface. The controller 130 may be implemented with a general purpose processor, a content addressable memory, a digital signal processor (DSP), an application-specific integrated circuit (ASIC), a field-programmable gate array (FPGA), any suitable programmable logic device, discrete gate or transistor logic, discrete hardware components, or any combination thereof. The controller 130 includes processing logic that may be configured to carry out the functions, techniques, and processing tasks associated with the operation of the touch sense interface 101. The steps of a method disclosed herein may be embodied in hardware, in firmware, in a software module executed by the controller 130, or in a combination thereof.

Typically, the type (including magnitude, frequency, phase and duration) of the noise at the measured pad 104 is the same as the type of the noise at the neighbor pad 105. However, as a finger approaches measured pad 104, more noise is coupled from the measured pad 104 to the noise touch sensing circuit 110 than from neighbor pad 105 to the noise touch sensing circuit. In one embodiment, when the finger is a few millimeters from the measured pad 104, the difference in the amount of noise coupled is by more than 20 dB. If there is sufficient noise present, a ratio of the amplitude of the coupled noise from the measured pad 104 to the amplitude of the coupled noise from the neighbor pad 105 may be used to detect a touch.

The amount of noise coupling from each pad to the noise touch sensing circuit 110 depends upon a layout of the touch panel 102, but a difference between the amount of noise coupled from a touch pad that is touched and the amount of noise coupled from a touch pad that is not touched always exists, regardless of layout.

In one embodiment of the noise touch sensing circuit 110, the noise power detector 111 may be implemented with a comparator with hysteresis, such as a Schmitt trigger, and the amplitude, or magnitude, of the noise power is determined by changing the positive and negative thresholds of the Schmitt trigger as a method of touch detection proceeds. Such embodiment advantageously uses common blocks already commonly in use in some capacitive sensing circuits. In other embodiments of the noise touch sensing circuit 110, other noise detectors are used.

Figure 2:
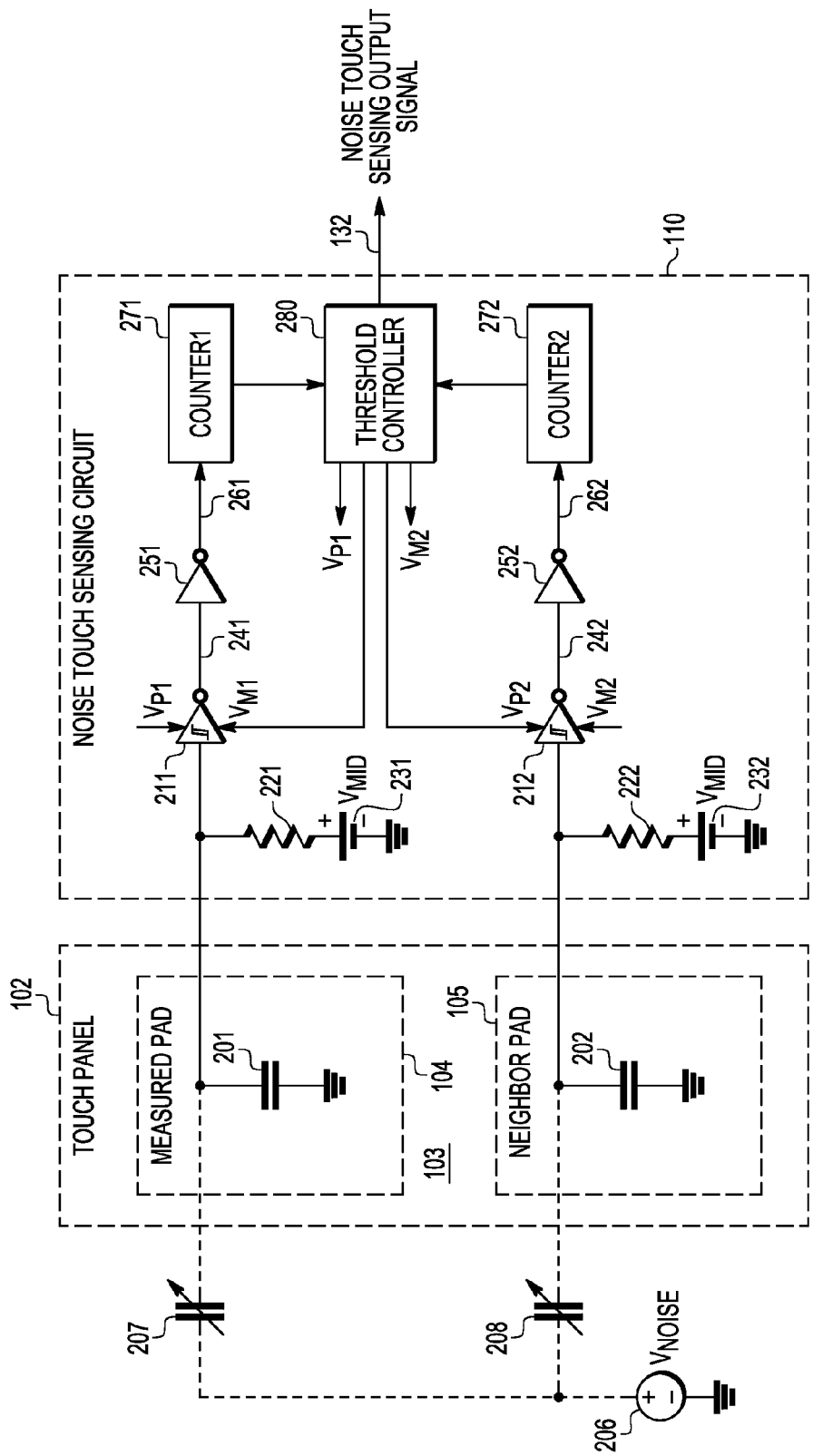
FIG. 2 is a more detailed schematic and block diagram of one embodiment of the touch panel and the noise touch sensing circuit of FIG. 1.

FIG. 2 is a more detailed schematic and block diagram of one embodiment of the touch panel 102 and one embodiment of the noise touch sensing circuit 110. Advantageously, the noise touch sense interface circuit 110 can be used with the touch panel 102 to sense a touch under noisy electromagnetic conditions. The touch panel 102 includes a measured pad (hereinafter also referred to as pad1) 104 and a neighbor pad (hereinafter also referred to as pad2) 105. The measured pad 104 includes a capacitor 201 with one end coupled to ground potential and another end coupled to the noise touch sensing circuit 110. The capacitor 201 represents all the capacitance at the measured pad 104, and includes capacitances due to printed circuit board traces, and capacitances due to the layers of the touch panel 102. The neighbor pad 105 includes a capacitor 202 with one end coupled to ground potential and another end coupled to the noise touch sensing circuit 110. The capacitor 202 represents all the capacitance at the neighbor pad 105, and includes capacitances due to printed circuit board traces, and capacitances due to the layers of the touch panel 102. In one embodiment, capacitor 201 and capacitor 202 each has a capacitance that is fixed at a value between approximately 5 pF and 50 pF, depending on construction of the touch panel 102.

FIG. 2 also illustrates an alternating current (AC) voltage source 206 that represents noise originating from outside both the touch panel 102 and the noise touch sensing circuit 110. The noise represented by voltage source 206 includes noise emanating from all types of sources near the touch panel 102, such as electrical utility wiring, electrical and electronic devices, and miscellaneous generators of electromagnetic fields. The voltage source 206 is effectively coupled to the measured pad 104 by a variable capacitor 207. The voltage source 206 is effectively coupled to the neighbor pad 105 by a variable capacitor 208. The variable capacitors 207 and 208 are not discrete capacitors, but represent capacitances created by a user's finger to respective pads. Typically, each variable capacitor 207 and 208 has a capacitance that varies between approximately 0 pF and 100 pF, depending on distance of a user's finger from the measured pad 104 and the neighbor pad 105, respectively. The voltage source 206, the variable capacitors 207 and the variable capacitor 208 are not part of the touch sense interface 101 and they are not part of the touch panel 102. In particular, the voltage source 206, the variable capacitors 207 and the variable capacitor 208 are not part of the noise touch sensing circuit 110.

In the embodiment illustrated in FIG. 2, the noise touch sensing circuit 110 comprises a first Schmitt trigger 211 having an input node coupled to the measured pad 104, and a second Schmitt trigger 212 having an input node coupled to the neighbor pad 105. The noise touch sensing circuit 110 also comprises a first resistor 221 with one end coupled to the input node of the first Schmitt trigger 211 and with another end coupled to a direct current (DC) voltage source 231 that provides a fixed DC voltage. The noise touch sensing circuit 110 further comprises a second resistor 222 with one end coupled to the input node of the second Schmitt trigger 212 and with another end coupled to a direct current (DC) voltage source 232 that provides a fixed DC voltage. In one embodiment, voltage source 231 and voltage source 232 provide a voltage $V_{mid}$ that is midway between $V_{cc}$ and ground potential. In one embodiment, $V_{cc}$=1.7V and $V_{mid}$=0.85V. In such embodiment, resistor 221 and resistor 222 each has a resistance that is fixed at a value between approximately 100-200 kΩ.

The first Schmitt trigger 211 provides an inverted output signal 241. An output node of the first Schmitt trigger 211 is coupled to a first inverter 251. The second Schmitt trigger 212 provides an inverted output signal 242. An output node of the second Schmitt trigger 212 is coupled to a second inverter 252. An output node of the first inverter 251 is coupled to a counter1 271. An output node of the second inverter 252 is coupled to a counter2 272. Inverter 251 outputs a signal 261, and inverter 251 outputs a signal 262. Counter1 271 and counter2 272 provide, to a threshold controller 280, a count of the toggling of an output signal of the first Schmitt trigger 211 and the second Schmitt trigger 212, respectively. The threshold controller 280, which may include a memory, is programmed to output a positive threshold value $V_{p1}$ and a negative threshold value $V_{m1}$ to the first Schmitt trigger 211. The threshold controller 280 also outputs a positive threshold value $V_{p2}$ and a negative threshold value $V_{m2}$ to the second Schmitt trigger 212.

The output of each Schmitt trigger 211 and 212 changes its state in response to the voltage at the input node of the respective Schmitt trigger reaching either the upper voltage threshold $V_p$ or the lower voltage threshold $V_m$ of the Schmitt trigger.

In one embodiment, the fixed DC voltage $V_{mid}$ at the input node of each Schmitt trigger 211 and 212 is at a level that is half-way between the thresholds of each Schmitt trigger, i.e., $V_{mid}=(V_{p1}+V_{m1})/2=(V_{p2}+V_{m2})/2$.

Each counter 271 and 272 counts the number of times that input voltage of the respective Schmitt trigger 211 and 212 exceeds a present value of $V_p$. The threshold controller 280 changes the voltage thresholds $V_m$ and $V_p$ of the respective Schmitt trigger 211 and 212 by a programmed amount each time the value of counter1 271 and counter2 272, respectively, is increased.

Each Schmitt trigger 211 and 212 has programmable $V_p$ and $V_m$ thresholds. The $V_p$ and $V_m$ thresholds are changed via control bits from the threshold controller 280. The method of noise detection in accordance with one embodiment of the invention initiates with $V_p$ and $V_m$ close to the $V_{mid}$ voltage and with a count of "000" at both counter1 271 and at counter2 272. For example, in one embodiment, when $V_{cc}$ is 1.7V, $V_{mid}$ is typically chosen to be 0.85V. In such one embodiment, each $V_p$ is initially set at 0.87V and each $V_m$ is initially set at 0.83V. As the count is increased, the $V_p$ and $V_m$ of each Schmitt trigger 211 and 212 are set to voltages farther away from $V_{mid}$. For all selections of $V_p$ and $V_m$, $V_p+V_m=V_{mid}$.

When a finger approaches the touch panel 102, there are several effective capacitances that arise due to proximity of the finger to the touch panel. Among the capacitances that arise are a finger-to-pad1 capacitance $C_{fp1}$ 207 and a finger-to-pad2 capacitance $C_{fp2}$ 208. The capacitances, $C_{fp1}$ 207 and $C_{fp2}$ 208 are intimately involved in noise coupling from the respective pad to the noise touch sensing circuit 110. The capacitances, $C_{fp1}$ 207 and $C_{fp2}$ 208 act as if each of them are connected between a source of noise and pad1 104 and pad2 105, respectively. Therefore, in FIG. 2, the voltage source 206 and $C_{fp1}$ 207 are shown connected in series with each other and in parallel with capacitor 201 of pad1 104. And, therefore, voltage source 206 and $C_{fp2}$ 208 are shown connected in series with each other and in parallel with capacitor 202 of pad2 105.

A value of $C_{fp1}$ 207 depends on a distance of the finger from pad1 104. A value of $C_{fp2}$ 208 depends on a distance of the finger from pad2 105. Therefore, $C_{fp1}$ 207 and $C_{fp2}$ 208 can be modeled as variable capacitors, as illustrated in FIG. 2. As a finger approaches pad1 104, the capacitance $C_{fp1}$ 207 becomes much larger than the capacitance $C_{fp2}$ 208. Therefore, the impedance $Z_{fp1}$ between pad1 104 and the source of noise becomes much lower than the impedance $Z_{fp2}$ between pad2 105 and the source of noise, as expressed below.

$$Z_{fp2} = \frac{1}{j2\pi f C_{fp2}},$$

and $$Z_{fp1} = \frac{1}{j2\pi f C_{fp1}},$$

where f is the frequency of the noise. The lower the impedance between the noise source 206 and a pad, the more noise is coupled from such pad to the noise touch sensing circuit 110. As a result, when pad1 104 is touched, the coupled noise from pad1 is much larger than the coupled noise from pad2 105.

Disruption of operation of the capacitive touch sense interface circuit 120 may occur because EM noise is inserted in touch pads, and the EM noise may affect the measurement of the external oscillation frequency. Low frequency (below about 150 kHz) EM noise injection into touch pads is typically not a problem because noise at such frequencies tend not to be induced into touch pads. High frequency (above about 80 MHz) EM noise injection into touch pads is typically not a problem because it may be controlled by a low pass filter located at the input to the capacitive touch sense interface circuit 120. However, medium frequency (150 kHz to 80 MHz) EM noise injection into touch pads may be a problem because such medium frequency is high enough to pass substantial AC current caused by a touch and because such medium frequency EM noise oftentimes includes a frequency at or near an operating frequency of the capacitive touch sense interface circuit 120.

Figure 3:
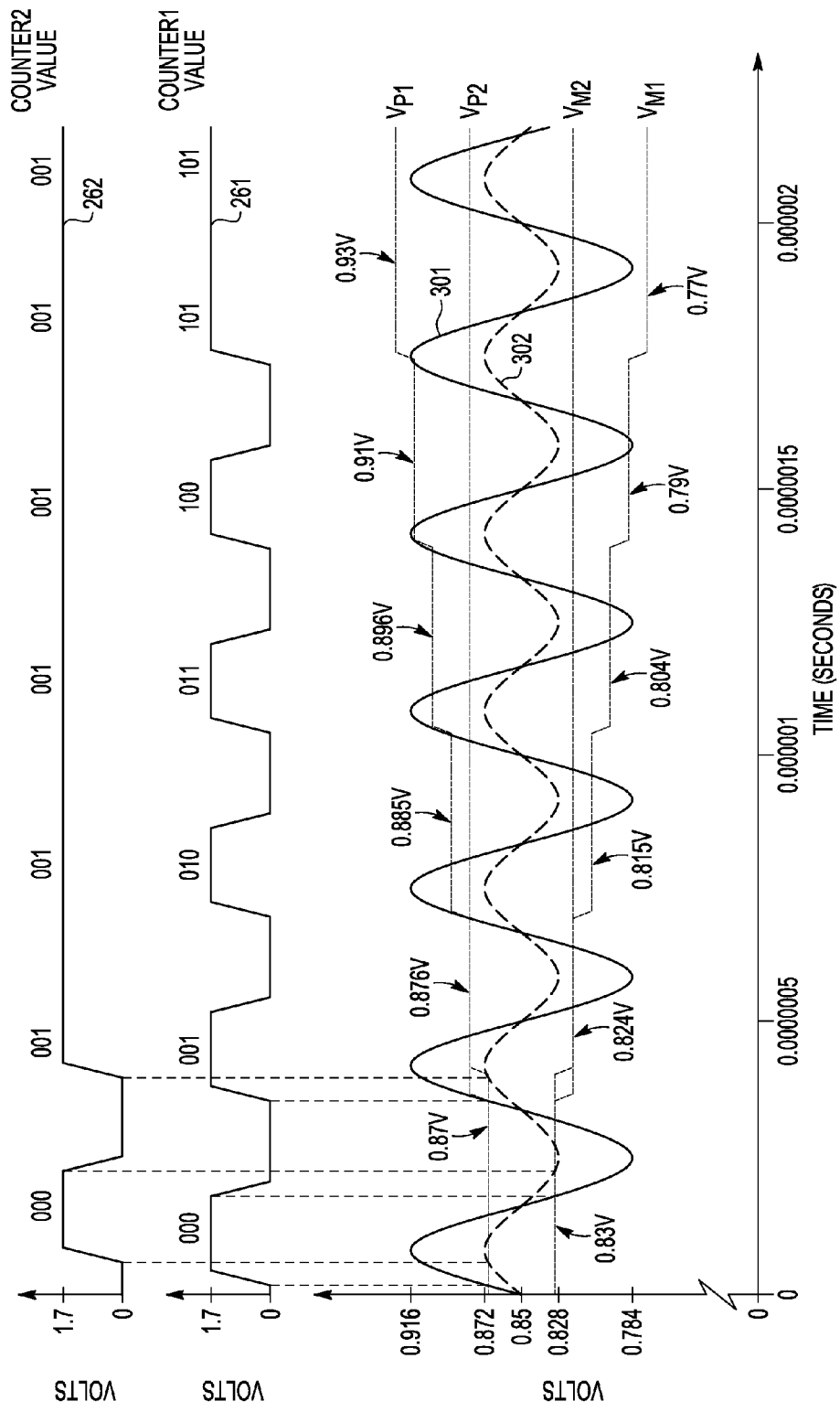
FIG. 3 is a graph of exemplary signals present in the touch sense interface system of FIGS. 1 and 2.

FIG. 3 is a graph 300 of exemplary signals present in the touch sense interface system 100. The noise in pad1 104 and pad2 105, which is advantageously used by the noise touch sensing circuit 110, is often pseudorandom and can vary in power, frequency and duration in an unknown manner. For purpose illustration and to simplify the description of operation of the noise sensing circuit 110, in FIG. 3 the noise in pad1 104 and the noise in pad2 105 are represented by sinusoidal signals (waveform 301 and 302) of a same frequency and phase, but different amplitudes. In the example illustrated in FIG. 3, noise associated with pad1 104 is represented as waveform 301 and noise associated with and pad2 105 is represented as waveform 302. Waveform 301 and waveform 302 are simplified representations of different amplitudes of a same noise represented by voltage source 206. The waveform 301 has a frequency of 8 MHz and a magnitude of 0.132 V peak-to-peak. The waveform 302 has a frequency of 8 MHz and a magnitude of 0.044 V peak-to-peak. Waveform 301 and waveform 302 represent an example of medium frequency (150 kHz-80 MHz) noise that can disrupt operation of the capacitive sensing touch circuit 120.

Whenever waveform 301 reaches or goes beyond any of the increasing threshold voltages ($V_{p1}$, $V_{m1}$) of the Schmitt trigger 211 associated with pad1 104, the output of the Schmitt trigger changes its output value, i.e., the output of the Schmitt trigger toggles. Whenever 302 reaches or goes beyond any of the increasing threshold voltages ($V_{p2}$, $V_{m2}$) of the Schmitt trigger 212 associated with pad2 105, the output of the Schmitt trigger changes its output value, i.e., the output of the Schmitt trigger toggles.

As shown in FIG. 3, when the noise is greater than $V_{p1}$, the value of the signal 261 outputted by inverter 251 is at a logical high value. Similarly, when the noise is greater than $V_{p2}$, the value of the signal 262 outputted by inverter 252 is at a logical high value. When the noise is less than $V_{p1}$, the value of the signal 261 outputted by inverter 251 is at a logical low value. Similarly, when the noise is less than $V_{m2}$, the value of the signal 262 outputted by inverter 252 is at a logical low value.

The output voltage of each inverter 251 and 252 toggles between logical "1" and logical "0" in response to peaks in noise. In one embodiment, if $V_{cc}$=1.7V, the signal 261 and 262 outputted by inverter 251 and 252, respectively, toggles between 0V and 1.7V.

The first occasion that the voltage at pad1 104, or waveform 301, reaches or goes beyond threshold voltages ($V_{p1}$, $V_{m1}$) of the Schmitt trigger 211, counter1 271 is pre-assigned a value of "000". After, in one embodiment, 0.2 μs, at each occasion that the voltage at pad1 104, or waveform 301, reaches or goes beyond threshold voltages ($V_{p1}$, $V_{m1}$) of the Schmitt trigger 211, counter1 271 is increased by "1", and the threshold voltages ($V_{p1}$, $V_{m1}$) of the Schmitt trigger are changed. This occurs at each rising edge of the output of the inverter 251.

The first occasion that the voltage at pad2 105, or waveform 302, reaches or goes beyond threshold voltages ($V_{p2}$, $V_{m2}$,) of the Schmitt trigger 212, counter2 272 is pre-assigned a value of "000". After a short time, which in the one embodiment shown in FIG. 3 is after 0.2 μs, at each occasion that the voltage at pad2 105, or waveform 302 reaches or goes beyond threshold voltages ($V_{p2}$, $V_{m2}$) of the Schmitt trigger 212, counter2 272 is increased by "1", and the threshold voltages ($V_{p2}$, $V_{m2}$) of the Schmitt trigger are changed. This occurs at each rising edge of the output 262 of the inverter 252.

The counter values are shown in binary notation in FIG. 3. Counter2 272 increases to count "001", but does not increase further because the thresholds ($V_{p2}$, $V_{m2}$) of the Schmitt trigger 212 associated with pad2 105 are not crossed anymore. Counter1 271 increases until it attains a value of "011" because the amplitude of the noise of pad1 104 is higher than the amplitude of the noise in pad2 105. Counter1 271 does not increase beyond "011" because the thresholds ($V_{p1}$, $V_{m1}$) of the Schmitt trigger 211 associated with pad1 104 are not crossed anymore. The values of the thresholds ($V_{p1}$, $V_{m1}$ and $V_{p2}$, $V_{m2}$) that correspond to each count value of the counters 271 and 272, respectively, are stored in a memory. The noise touch sensing circuit 110 is pre-programmed to associate the values of Schmitt trigger thresholds that correspond to each count value of the respective counter 271 and 272. As a result, the noise touch sensing circuit 110 is able to determine, from the count value of the respective counter 271 and 272, the ratio of the amplitude of the noise in the measured pad 104 to the value of the amplitude of the noise in the neighbor pad 105.

Values of $V_{p1}$ and $V_{m1}$ of Schmitt trigger 211 are generated by the threshold controller 280 as follows. In the one embodiment, as illustrated in FIG. 3, at startup the value of counter1 271 is "000" and the value of counter2 272 is "000", and a first ($V_{p1}$-$V_{m1}$) is preset to 0.04V. Therefore, initially, $V_{p1}$=0.85+0.04/2=0.87V, and $V_{m1}$=0.85−0.04/2=0.83V.

A second ($V_{p1}$-$V_{m1}$)=0.04*1.3160=0.053. Therefore, $V_{p1}$=0.85+0.053/2=0.876, and $V_{m1}$=0.85−0.053/2=0.824.

A third ($V_{p1}$-$V_{m1}$)=0.053*1.3160=0.070. Therefore, $V_{p1}$=0.85+0.070/2=0.885, and $V_m$=0.85−0.070/2=0.815.

A fourth ($V_{p1}$-$V_{m1}$)=0.070*1.3160=0.092. Therefore, $V_{p1}$=0.85+0.092/2=0.896, and $V_{m1}$=0.85−0.092/2=0.804.

A fifth ($V_{p1}$-$V_{m1}$)=0.092*1.3160=0.121. Therefore, $V_{p1}$=0.85+0.121/2=0.910, and $V_{m1}$=0.85−0.121/2=0.790.

A sixth ($V_{p1}$-$V_{m1}$)=0.121*1.3160=0.159. Therefore, $V_{p1}$=0.85+0.159/2=0.930, and $V_{m1}$=0.85−0.121/2=0.770.

A seventh ($V_{p1}$-$V_{m1}$)=0.159*1.3160=0.209. Therefore, $V_{p1}$=0.85+0.209/2=0.955, and $V_{m1}$=0.85−0.121/2=0.745. And so on.

Values of ($V_{p2}$-$V_{m2}$) of Schmitt trigger 212 are generated in an analogous manner.

In this one embodiment, the ($V_{p1}$-$V_{m1}$) value is changed from one step to another step by a ratio of $3^{0.25}$=1.316. The ratio of 1.316 is equivalent to +2.385 dB. In other words, in response to each increase in the value of the count of counter1 271, a new value for ($V_{p1}$-$V_{m1}$) is produced by multiplying a previous value of ($V_{p1}$-$V_{m1}$) by the factor 1.316. In another embodiment, the ($V_{p1}-V_{m1}$) value is changed from one step to another step by another ratio. A larger ratio would tend to produce results faster, but less accurately. A smaller ratio would tend to produce more accurate results, but with a slower response time.

In FIG. 3, the sinusoidal waveform 302, which has a peak-to-peak voltage of 0.044V, is the signal that represents the noise in the neighbor pad, or pad2 105. The highest voltage reached by waveform 302 is 0.872V. In this simplified example, the $V_p$=0.870 threshold is exceeded by waveform 302. The next positive threshold, $V_p$=0.876, is not exceeded by waveform 302. In this simplified example, the positive threshold $V_{p2}$ of the second Schmitt trigger 212 is exceeded only one time after the negative threshold is exceeded, and, as a result, the highest value of counter2 272 is "001".

In FIG. 3, the sinusoidal waveform 301, which has a peak-to-peak voltage of 0.132V, is the signal that represents the noise in the measured pad, or pad1 104. The highest voltage reached by waveform 301 is 0.916V. In this simplified example, the following thresholds are exceeded by waveform 301: $V_p$=0.870, $V_p$=0.876, $V_p$=0.885, $V_p$=0.896 and $V_p$=0.910. The next positive threshold, $V_p$=0.930, is not exceeded by waveform 301. In this simplified example, the positive threshold $V_{p1}$ of the first Schmitt trigger 211 is exceeded five times after the negative threshold is exceeded, and, as a result, the highest value of counter1 271 is "5" or "101" in binary.

In one embodiment, each successive ($V_{p1}-V_{m1}$) and ($V_{p2}-V_{m2}$) threshold difference is increased by a same ratio over a previous ($V_{p1}-V_{m1}$) and ($V_{p2}-V_{m2}$) threshold difference. An advantage of using a same ratio for each and every ($V_{p1}-V_{m1}$) and ($V_{p2}-V_{m2}$) threshold difference is that a total ratio between pad1 104 and pad2 105 can be calculated by multiplying the final difference between the number of steps by the decibel value of each step. Assume, in another example of noise sensing that, after determination that a touch has occurred, pad1 104 toggled until threshold number "7" and pad2 105 toggled until threshold number "3". In such example, the difference of "4" between the threshold numbers of pad1 104 and pad2 105 is equivalent to 4*2.385 dB=9.54 dB. However, in another embodiment of the noise touch sensing circuit 110, each successive threshold difference, ($V_{p1}-V_{m1}$) and ($V_{p2}-V_{m2}$), is increased over a previous threshold difference, but each successive threshold difference is not increased by a same ratio over a previous threshold difference.

Another way to calculate that the noise in pad1 104 is 9.54 dB greater than the noise in pad2 105 is as follows. Threshold number 7≥($V_p-V_m$)=0.209V. Threshold number 3≥($V_{p1}-V_{m1}$)=0.070. The ratio=0.209/0.070=3, which can be expressed in decibel form as 20 log 10(3)=9.54 dB. Therefore, at least 9.54 dB, which is almost 10 dB, or three times the noise power, is needed to detect a touch. Because the number of decibels for each threshold change is known, i.e., 2.385 dB, the threshold controller 280 is programmed to determine that a touch has occurred when a difference between a count of counter1 271 and a count of counter2 272 is at least "3". When the threshold controller 280 determines that a touch has occurred, the noise touch sensing circuit 110 outputs a noise touch sense signal 132.

In one embodiment, the touch sense interface system 100 that includes a touch panel 102 having a plurality of pads 103 also includes a noise touch sensing circuit 110 having a plurality of Schmitt triggers and counters, such as Schmitt triggers 211 and 212, wherein a number of pads equals a number of Schmitt triggers. Each Schmitt trigger is associated with one pad. If the noise detected in any one pad, for example, a first pad, is at least a pre-selected amount greater than the noise detected in a second pad, then a touch is detected at the first pad, wherein the second pad is one pad among possibly several pads of the plurality of pads 103 of the touch panel 102 that are equally closest to the first pad.

One method in accordance with the invention uses noise detection to accomplish touch sensing when capacitive detection fails such as during EM aggression. In another embodiment, the noise touch sensing circuit 110 is operational while the capacitive touch sensing circuit 120 is still operational, and such combination is used to implement a robust touch interface 101.

To ensure that the touch sense interface 101 provides touch sensing results without disruption regardless of noise power and noise frequency, the noise touch sensing circuit 110 and the noise touch sensing circuit 110 have a complementary design. A complementary design means that the capacitive touch sensing circuit 120 is designed to be able detect a touch during combinations of power and frequency of noise at which the capacitive touch sensing circuit 120 is unable to detect a touch, and vice versa. In accordance with one embodiment of the invention, the minimum power at which the noise touch sensing circuit 110 is able to start working is advantageously lower than the maximum power at which the capacitive touch sensing circuit 120 is able to continue working.

In a touch sense interface 101 that includes both a noise touch sensing circuit 110 and a capacitive touch sensing circuit 120, if the noise touch sensing circuit determines that there is enough noise at the measured pad 104, the controller 130 causes the noise touch sensing circuit to be used for touch sensing. If the noise touch sensing circuit 110 determines that there is not enough noise at the measured pad 104, the controller 130 causes the capacitive touch sensing circuit 120 to be used for touch sensing.

The noise touch sensing circuit 110 in accordance with the invention and the capacitive touch sensing circuit 120 are activated during different, alternating, time slots. The noise touch sensing circuit 110 is activated during a noise sensing interval, and the capacitive touch sensing circuit 120 is activated during a capacitive sensing interval.

Because of the random and unpredictable nature of noise, in one embodiment, noise detection is performed simultaneously in the measured pad 104 and neighbor pad 105. Otherwise, additional debouncing and filtering would be necessary to ensure reliable touch sensing. However, debouncing, filtering and other processing may be added without causing problems.

FIG. 4 is a flow diagram 400 of one embodiment of a touch detection method used by the noise touch sensing circuit 110 of the touch sense interface 101, which can be used with the touch panel 102. The method starts when the controller 130 initiates the noise sensing interval at step 401. At step 402, the positive and negative thresholds of the Schmitt trigger 211 associated with measured pad (pad1) 104 are set to their initial values, which are values closest to $V_{mid}$. Simultaneously, at step 403, the positive and negative thresholds of the Schmitt trigger 212 associated with neighbor pad (pad2) 105 are set to their initial values, which are values closest to $V_{mid}$. At step 404, the threshold controller 280 checks whether the output of the Schmitt trigger 211 toggles at a present value of $V_{p1}$ and $V_{m1}$. If the output of the Schmitt trigger 211 toggles at the present value of $V_{p1}$ and $V_{m1}$, then, at step 406, the value of $V_{p1}$ is increased and the value of $V_{m1}$ is decreased. If the output of the Schmitt trigger 211 does not toggle at the present value of $V_{p1}$ and $V_{m1}$, then, at step 408, the threshold controller 280 checks whether the noise sensing interval has ended. If the noise sensing interval has not ended yet, then flow goes back to step 404. If the noise sensing interval has ended, then, at step 410, the threshold controller 280 determines whether the output of the Schmitt trigger 211 toggled during the noise sensing interval. If the output of the Schmitt trigger 211 did not toggle at all during the noise sensing interval, which would occur if there is insufficient noise to sense a touch using the noise touch sensing circuit 110, then, at step 412, the controller 130 starts the capacitive sensing interval. If the output of the Schmitt trigger 211 did toggle during the noise sensing interval, then, at step 414, the threshold controller 280 saves into a memory the maximum $(V_{p1}-V_{m1})$ value that resulted in toggling of the output of the Schmitt trigger 211, and saves the maximum $(V_{p1}-V_{m1})$ value as pad1$V_{pm}$.

After step 403, the method proceeds to steps 405, 407, 409 and 411. Steps 405, 407, 409 and 411, which involve Schmitt trigger 212, are analogous to steps 404, 406, 408 and 410, which involve Schmitt trigger 211, and, therefore, the details of which will not be repeated here.

After step 411, the flow goes to step 413. If the output of the Schmitt trigger 212 did not toggle at all during the noise sensing interval, then, at step 413, the threshold controller 280 sets a value of pad2$V_{pm}$ to one level below a lowest detection level. The lowest detection level is the initial value of $(V_{p2}-V_{m2})$, which also corresponds to a value of counter2 272 being "000". The fact that the output of the Schmitt trigger 211 does not toggle at all during the noise sensing interval means that the peak-to-peak voltage of the noise in pad2 105 is less than the initial value of $(V_{p2}-V_{m2})$. Therefore, the step of setting the value of pad2$V_{pm}$ to one level below the lowest detection level means that the threshold controller 280 operates as if the value of counter2 272 were set to "−001". The fact that the output of the Schmitt trigger 212 does not toggle at all during the noise sensing interval means that the noise in pad2 105 may be so low that setting the value of counter2 272 to "−002", "−003" or less, may be a more accurate representation of the noise level in pad2. However, on occasions that the output of the Schmitt trigger 212 does not toggle at all during the noise sensing interval, the noise touch sensing circuit 110 does not provide any value for the noise in pad2 105 (other than being below the lowest detection level). Therefore, to reduce the probability of error, the invention assumes, at this juncture of the method, that the noise level in pad2 105 is higher (i.e., "−001") rather than lower (e.g., "−002"). Next, the flow goes to step 416. If the output of the Schmitt trigger 212 did toggle during the noise sensing interval, then, at step 415, the threshold controller 280 saves into a memory the maximum $(V_{p2}-V_{m2})$ value that resulted in toggling of the output of the Schmitt trigger 212, and saves the maximum $(V_{p2}-V_{m2})$ value as pad2$V_{pm}$. After steps 414 and 415, the method proceeds to step 416.

At step 416, the value of pad1$V_{pm}$ is compared to the value of pad2$V_{pm}$, and an amount by which pad1$V_{pm}$ is above pad2$V_{pm}$ is determined. At step 417, if the amount by which pad1$V_{pm}$ is above pad2$V_{pm}$ is at least a pre-selected amount, the flow goes to step 418. At step 418, the noise touch sensing circuit 110 outputs a signal that indicates that a touch has occurred at the measured pad 104. At step 417, if the amount by which pad1$V_{pm}$ is above pad2$V_{pm}$ is not at least the pre-selected amount, the flow goes to step 419. At step 419, the threshold controller 280 determines whether the value of pad1$V_{pm}$ is high enough for the noise touch sensing circuit 110 to possibly determine occurrence of a touch, using noise, if a touch had indeed occurred. In one embodiment, "high enough" means a value corresponding to at least about 10 dB greater than the lowest detection level. If the value of pad1$V_{pm}$ is high enough, the flow goes to step 420, and the noise touch sensing circuit 110 outputs a signal that indicates that a touch has not occurred at the measured pad 104. If the value of pad1$V_{pm}$ is not high enough, the flow goes to step 421, and the controller 130 starts the capacitive sensing interval.

Advantageously, the noise touch sensing method in accordance with the invention has no maximum limit in noise power for detection. Any limitations that may exist arise from implementations of the noise touch sensing circuit 110, such as the maximum $V_p$ and $V_m$ thresholds in a particular implementation.

In some embodiments of the touch sense interface 101, the controller 130 and the threshold controller 280 are separate components. In other embodiments of the touch sense interface 101, the functions of the controller 130 and the threshold controller 280 are performed by a single microcontroller or microprocessor.

Although the invention is described herein with reference to specific embodiments, various modifications and changes can be made without departing from the scope of the present invention as set forth in the claims below. For instance, although the description of one embodiment of the touch sense interface 101 states that it is disposed on the integrated circuit 106, the touch sense interface is equally usable when constructed entirely of components consisting of discrete devices. Although the description of one embodiment of the noise touch sensing circuit 110 refers to detection or sensing of the proximity and/or presence of a finger of a user, the noise touch sensing circuit is equally applicable to detection or sensing of the proximity and/or presence of another kind of conductive or semiconductive object.

Although, in one embodiment, the touch sense interface 101 is disposed on an integrated circuit 106 fabricated using CMOS technology, the touch sense interface can also be disposed on an integrated circuit fabricated using other technologies. Although the invention has been described with respect to specific conductivity types or polarity of potentials, skilled artisans appreciated that conductivity types and polarities of potentials may be reversed.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims. Unless stated otherwise, terms such as "first" and "second" are used to arbitrarily distinguish between the elements such terms describe.

Thus, these terms are not necessarily intended to indicate temporal or other prioritization of such elements. Note that the term "couple" has been used to denote that one or more additional elements may be interposed between two elements that are coupled.

Although the invention is described herein with reference to specific embodiments, various modifications and changes can be made without departing from the scope of the present invention as set forth in the claims below.

What is claimed is:

1. A noise touch sensing circuit for detecting electromagnetic (EM) noise at pads of a touch panel, the noise touch sensing circuit comprising:
   a first comparator with hysteresis having an input node coupled to a first pad of a touch panel, the first comparator with hysteresis outputting a first signal responsive to magnitude of EM noise at the first pad;

a second comparator with hysteresis having an input node coupled to a second pad of the touch panel, the second comparator with hysteresis outputting a second signal responsive to magnitude of EM noise at the second pad;
a first counter for counting toggling of the first signal;
a second counter for counting toggling of the second signal; and
a threshold controller, coupled to the first comparator with hysteresis and to the second comparator with hysteresis, wherein the threshold controller:
sets a positive threshold ($V_{p1}$) and a negative threshold ($V_{m1}$) of the first comparator in response to a count outputted by the first counter,
sets a positive threshold ($V_{p2}$) and a negative threshold ($V_{m2}$) of the second comparator in response to a count outputted by the second counter, and
outputs a noise touch sensing signal in response to a difference between the count of the first counter and the count of the second counter.

2. The noise touch sensing circuit of claim 1, wherein the threshold controller outputs a noise touch sensing signal when the count outputted by the first counter is greater than the count outputted by the second counter by a pre-selected amount.

3. The noise touch sensing circuit of claim 1, wherein the first comparator with hysteresis includes a first Schmitt trigger and wherein the second comparator with hysteresis includes a second Schmitt trigger.

4. The noise touch sensing circuit of claim 3, wherein the first comparator with hysteresis detects magnitude of a voltage attributable to EM noise at the first pad, and wherein the second comparator with hysteresis detects magnitude of a voltage attributable to EM noise at the second pad.

5. The noise touch sensing circuit of claim 4, including:
circuitry for maintaining a constant DC voltage at the input node of the first comparator with hysteresis; and
circuitry for maintaining a constant DC voltage at the input node of the second comparator with hysteresis.

6. The noise touch sensing circuit of claim 1, wherein the threshold controller:
increases the positive threshold ($V_{p1}$) and decreases the negative threshold ($V_{m1}$) of the first comparator in response to an increase in the count outputted by the first counter, and
increases the positive threshold ($V_{p2}$) and decreases the negative threshold ($V_{m2}$) of the second comparator in response to an increase in the count outputted by the second counter.

7. The noise touch sensing circuit of claim 6, wherein the threshold controller:
increases the positive threshold ($V_{p1}$) and decreases the negative threshold ($V_{m1}$) by a same factor over a previous setting of the respective threshold, and
increases the positive threshold ($V_{p2}$) and decreases the negative threshold ($V_{m2}$) by a same factor over a previous setting of the respective threshold.

8. The noise touch sensing circuit of claim 7, wherein the threshold controller outputs a noise touch sensing signal when the count of the first counter is greater than the count of the second counter by at least 3.

9. A method with a touch panel, the touch panel including a plurality of pads, comprising:
measuring power of electromagnetic (EM) noise in a first pad; and measuring power of EM noise in a second pad;
comparing the power of EM noise measured in the first pad to the power of EM noise measured in the second pad; and
providing an indication of a touch occurring at the first pad when the power of the EM noise measured in the first pad is a pre-selected amount greater than the power of the EM noise measured in the second pad,
wherein the step of measuring power of EM noise in a first pad includes:
setting a positive threshold of a first comparator with hysteresis, coupled to the first pad, to a low value and setting a negative threshold of the first comparator with hysteresis to a high value;
in response to an output signal of the first comparator with hysteresis, changing thresholds by increasing the positive threshold and decreasing the negative threshold of the first comparator with hysteresis;
for each change of thresholds, calculating a difference between the positive threshold and the negative threshold; and
storing, as pad1$V_{pm}$, a maximum difference between the positive threshold and the negative threshold that resulted in toggling of the output signal of the first comparator with hysteresis.

10. The method of claim 9, wherein the step of measuring power of EM noise in a second pad includes:
setting a positive threshold of a second comparator with hysteresis, coupled to the second pad, to a low value and setting a negative threshold of the second comparator with hysteresis to a high value;
in response to an output signal of the second comparator with hysteresis, changing thresholds by increasing the positive threshold and simultaneously decreasing the negative threshold of the second comparator with hysteresis;
for each change of thresholds, calculating a difference between the positive threshold and the negative threshold; and
storing, as pad2$V_{pm}$, a maximum difference between the positive threshold and the negative threshold that resulted in toggling of the output signal of the second comparator with hysteresis.

11. The method of claim 10, in which the step of measuring power of EM noise in a first pad and the step of measuring power of EM noise in a second pad are performed during a same time interval, and in which the step of comparing the power of EM noise in the first pad to the power of EM noise in the second pad includes calculating pad1$V_{pm}$ minus pad2$V_{pm}$.

12. The method of claim 11, in which the step of outputting a signal indicative of a touch occurring at the first pad includes determining whether pad1$V_{pm}$ is a pre-selected amount greater than pad2$V_{pm}$.

13. The method of claim 9, in which
the step of measuring power of EM noise in the second pad includes measuring power of EM noise in a plurality of neighboring pads, wherein the plurality of neighboring pads constitute pads that are closest to the first pad;
the step of comparing includes comparing the power of EM noise measured in the first pad to an average of power of EM noise measured in each of the plurality of neighboring pads; and
the step of providing includes providing an indication of a touch occurring at the first pad when the power of the EM noise measured in the first pad is a pre-selected amount greater than the average of the power of the EM noise measured in each of the plurality of neighboring pads.

* * * * *

UNITED STATES PATENT AND TRADEMARK OFFICE
CERTIFICATE OF CORRECTION

PATENT NO. : 8,599,169 B2  Page 1 of 1
APPLICATION NO. : 13/325747
DATED : December 3, 2013
INVENTOR(S) : Ivan Carlos Ribeiro Nascimento It is certified that error appears in the above-identified patent and that said Letters Patent is hereby corrected as shown below:

In the Claims

Col. 14, in claim 12, lines 47-48:

change "outputting a signal indicative" to --providing an indication--.

Signed and Sealed this
Eighteenth Day of February, 2014

Michelle K. Lee
*Deputy Director of the United States Patent and Trademark Office*